(12) United States Patent  (10) Patent No.: US 8,825,925 B1
Singh et al.  (45) Date of Patent: Sep. 2, 2014

(54) SYSTEMS AND METHODS FOR SUPER SPEED PACKET TRANSFER

(75) Inventors: Gaurav Singh, Los Altos, CA (US); Herve LeTourneur, Mountain View, CA (US); Hans Van Antwerpen, Mountain View, CA (US); Cathal G. Phelan, Los Altos, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 170 days.

(21) Appl. No.: 13/026,434

(22) Filed: Feb. 14, 2011

(51) Int. Cl.
*G06F 3/00* (2006.01)
*G06F 13/12* (2006.01)

(52) U.S. Cl.
USPC .................................. 710/36; 710/38; 710/62

(58) Field of Classification Search
None
See application file for complete search history.

(56) References Cited

U.S. PATENT DOCUMENTS

2011/0208891 A1* 8/2011 Meyers .......................... 710/313
2012/0066418 A1* 3/2012 Foster ............................ 710/61

* cited by examiner

*Primary Examiner* — Idriss N Alrobaye
*Assistant Examiner* — David Martinez

(57) ABSTRACT

An example method and system process a SuperSpeed packet transferred at a SuperSpeed transfer rate and based on processing the SuperSpeed packet, generate a Universal Serial Bus (USB) 2.0 packet to be transferred at a USB 2.0 transfer rate, the USB 2.0 transfer rate being less than the SuperSpeed transfer rate.

21 Claims, 11 Drawing Sheets

SYSTEMS AND METHODS FOR SUPER SPEED PACKET TRANSFER

TECHNICAL FIELD

The subject matter relates to the field of electronic communication. More specifically, but not by way of limitation, various systems and methods for packet transfer are disclosed.

BACKGROUND

Universal Serial Bus (USB) is a cable bus that supports data exchange between a host computer and multiple simultaneously accessible peripherals. In the USB architecture a hub may, among other things, store and forward packets being transferred between a host and a device. The throughput or transfer rate of information transferred between the host and the device may be influenced by the rate at which the information is signaled by communication interfaces associated with the host, the hub, and the device.

The USB 2.0 specification (Hewlett Packard Company, et al., USB 2.0 Specification, rev. 2 (2000)) defines a nominal signaling rate of 480 Mbps, which the USB 2.0 specification refers to as a "High Speed" transfer rate. On the other hand, the USB 3.0 specification (Hewlett Packard Company, et al., USB 3.0 Specification, rev. 1 (2008)) defines a nominal signaling rate of 5 Gbps, which the USB 3.0 specification refers to as a "SuperSpeed" transfer rate. In practice, actual USB 2.0 and SuperSpeed signaling rates are typically less than the nominal USB 2.0 and SuperSpeed signaling rates.

A USB 3.0 hub is a logical combination of a SuperSpeed hub and a USB 2.0 hub. The SuperSpeed hub portion of a USB 3.0 hub is involved with the transfer of SuperSpeed packets between a host and USB 3.0 devices. The USB 2.0 hub portion of a USB 3.0 hub is involved with the transfer of USB 2.0 packets between the host and USB 2.0 devices. Depending on a number of USB 3.0 devices connected with the host through the USB 3.0 hub, SuperSpeed transfer rate capabilities between the USB 3.0 hub and the USB 3.0 host may be left underutilized.

BRIEF DESCRIPTION OF THE DRAWINGS

Example embodiments are illustrated by way of example and not limitation in the figures of the accompanying drawings in which.

DETAILED DESCRIPTION

Figure 1:
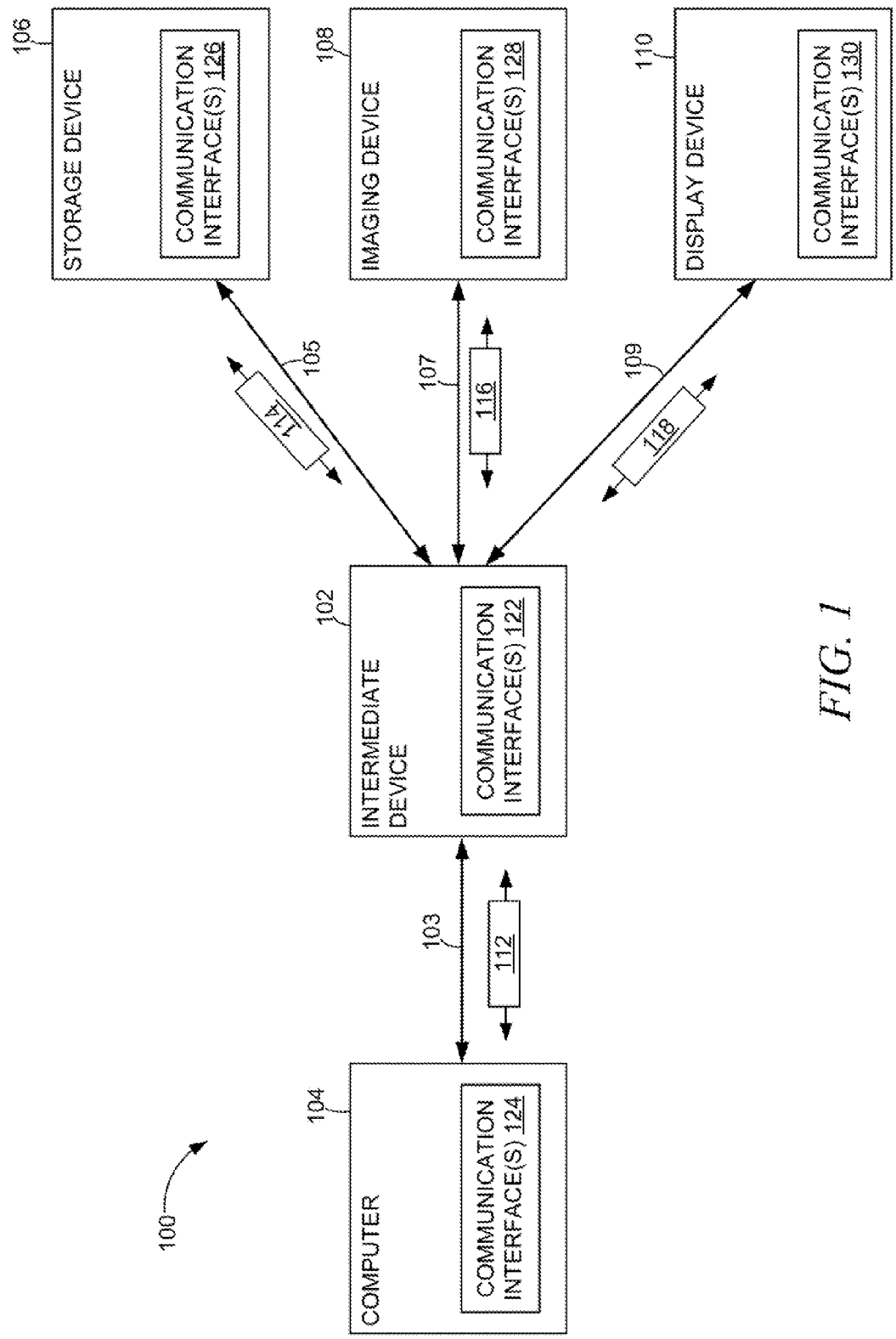
FIG. 1 is a block diagram illustrating an example network, in accordance with example embodiments.

Example embodiments of an intermediate device are overviewed and then explained in more detail below. Although some example embodiments are discussed in the context of USB, one having ordinary skill in the art will recognize that the inventive subject matter disclosed herein is certainly not limited to the context of USB.

When a conventional USB 3.0 hub is used to exchange information between a host (e.g., a USB 3.0 host) and a USB 2.0 device, the information is transferred in USB 2.0 packets, at a USB 2.0 transfer rate, between the host (e.g., a USB 3.0 host) and the USB 3.0 hub.

When an example intermediate device described herein is used to exchange the information between a host and the USB 2.0 device, the example intermediate device may associate SuperSpeed packets with USB 2.0 packets to allow the information to be transferred at a SuperSpeed transfer rate, between the host and the example intermediate device.

For a SuperSpeed packet transferred from a host at a SuperSpeed transfer rate, an example intermediate device may process the SuperSpeed packet and based on processing the SuperSpeed packet, the example intermediate device may generate a USB 2.0 packet to be transferred to a USB 2.0 device at a USB 2.0 transfer rate. For another USB 2.0 packet, this one transferred from the USB 2.0 device at the USB 2.0 transfer rate, the example intermediate device may process the other USB 2.0 packet, and based on processing the other USB 2.0 packet, the example intermediate device may generate a SuperSpeed packet to be transferred to the host at the SuperSpeed transfer rate.

In various example embodiments, a host (e.g., a modified USB 3.0 host) may enumerate and manage communication with USB 2.0 endpoints connected with the host through an example intermediate device. For these example embodiments, the host and the intermediate device may use USB 2.0 endpoints identifiers in SuperSpeed packets as part of implementing the communication. For a SuperSpeed packet received from the host, the example intermediate device may obtain from the SuperSpeed packet a USB 2.0 endpoint identifier representing a USB 2.0 endpoint and place the USB 2.0 endpoint identifier in a USB 2.0 packet that is to be transferred to the USB 2.0 endpoint. For another USB 2.0 packet, this one received from a USB 2.0 device, the example intermediate device may obtain from the other USB 2.0 packet, the USB 2.0 endpoint identifier and place the USB 2.0 endpoint identifier in another SuperSpeed packet, this SuperSpeed packet to be transferred to the host.

In various example embodiments, an example intermediate device may represent USB 2.0 endpoints to the host as SuperSpeed endpoints and the host may enumerate and manage communication with these SuperSpeed endpoints. For a SuperSpeed packet received from the host, the example intermediate device may obtain from the SuperSpeed packet a SuperSpeed endpoint identifier that represents a SuperSpeed endpoint, associate the SuperSpeed endpoint identifier with a USB 2.0 endpoint identifier that represents a USB 2.0 endpoint, and place the USB 2.0 endpoint identifier in a USB 2.0 packet to be transferred to the USB 2.0 endpoint. For another USB 2.0 packet, this one received from a USB 2.0 device, the example intermediate device may obtain from the other USB 2.0 packet, the USB 2.0 endpoint identifier, associate the USB 2.0 endpoint identifier with the SuperSpeed endpoint identifier, and place the SuperSpeed endpoint identifier in another SuperSpeed packet, this SuperSpeed packet to be transferred to the host.

In various example embodiments, the example intermediate device may represent SuperSpeed endpoints to the host as well as enumerate and manage communication with USB 2.0 endpoints connected with the host through the intermediate device. For a SuperSpeed packet, of a SuperSpeed transaction, received from the host, the intermediate device may confirm receipt of the SuperSpeed packet at a SuperSpeed endpoint. The intermediate device may then associate the SuperSpeed endpoint with a USB 2.0 endpoint and initiate a USB 2.0 transaction to transfer a USB 2.0 packet to the USB 2.0 endpoint. For another USB 2.0 packet this one received from the USB 2.0 device, the example intermediate device may confirm receipt of the other USB 2.0 packet at the USB 2.0 endpoint. The intermediate device may then associate or link the USB 2.0 endpoint with the SuperSpeed endpoint. Another SuperSpeed packet may then be transferred from the associated SuperSpeed endpoint to the host as part of the SuperSpeed transaction.

Through practice of the example embodiments described herein, transfer rate performance may be enhanced for packet transfer between a host and USB 2.0 device. Information being transferred to or from multiple USB 2.0 devices may be signaled at a SuperSpeed transfer rate between intermediate device and the host. Some example embodiments may reduce cost and resource consumption associated with the host and the intermediate device through avoiding the use of USB 2.0 communication interfaces (e.g., PHY hardware and protocol drivers). In example embodiments in which the intermediate device, rather than the host, enumerates and manages USB 2.0 endpoints, the example intermediate device may offload the host of consuming associated processing, storage, energy and other associated resources.

Below, the detailed description includes references to the accompanying drawings, which form a part of the detailed description. The drawings show illustrations in accordance with example embodiments. These example embodiments are described in enough detail to enable those skilled in the art to practice the claimed subject matter. The claimed subject matter may also be practiced through combinations of the example embodiments and through structurally, logically, and/or electrically modified versions of the example embodiments described herein. The following detailed description is, therefore, not to be taken in a limiting sense and the scope is defined by the appended claims and their equivalents.

As used herein, the term "USB 3.0" or "USB 3.0 Compliant" are used to mean a device (which may include one or more compliant components) that supports SuperSpeed signaling as defined in the USB 3.0 specification by the USB-IF (Implementers Forum), Inc. Similarly, the term "Hi-Speed conductors" is used to refer to the D+/D− lines that may be used for low, full or Hi-Speed signaling as defined in the USB 2.0 specification by the USB-IF. Additionally, it is possible for a USB 3.0 compliant device to support all or some of the capabilities defined by the USB 2.0 specification, and a USB 2.0 compliant device to support some of the capabilities defined by the USB 3.0 specification. These two specifications are used by way of example only and are not intended to be limiting with respect to the spirit of the method and apparatus embodiments described herein or their equivalence.

FIG. 1 is a block diagram illustrating an example network 100, in accordance with example embodiments. The example network 100 is shown to connect an intermediate device 102, a computer 104, a storage device 106, an imaging device 108, and a display device 110. The network 100 may allow the intermediate device 102, the computer 104, the storage device 106, the imaging device 108, and the display device 110 to exchange information with one another. It may be noted that the network 100 may connect additional network nodes, fewer network nodes, and/or different network nodes with the intermediate device 102, in accordance with some example embodiments.

Transmission media 103, 105, 107, and 109 are shown to connect the intermediate device 102 with the computer 104, the storage device 106, the imaging device 108, and the display device 110, respectively. The transmission media 103, 105, 107, and 109 may include any wired transmission media and/or wireless transmission media.

The network 100 may be associated with a communication protocol that facilitates the exchange of information. Alternatively or additionally, the example network may utilize multiple communication protocols to facilitate the exchange of information.

The intermediate device 102, the computer 104, the storage device 106, the imaging device 108, and the display device 110 are shown to include communication interfaces 122, 124, 126, 128, and 130, respectively, to implement communication protocol and to interact with units of information 112, 114, 116, and 118 (e.g., packets) transferred over the transmission media 103, 105, 107, and/or 109 of the network 100.

Each unit of information 112, 114, 116, and 118 may include identification information indicating a source and/or a destination of the unit of information (e.g., a communication interface identifier such as physical address or a logical endpoint). For example, the unit of information 114 may address the communication interface 126 of the storage device 106 with an endpoint identifier. Example communication interfaces are discussed further below in reference to FIGS. 4-10 below.

For some example embodiments, the network 100 may employ USB 3.0 and USB 2.0 as communication protocols to facilitate the exchange of information. The transmission media 103 and 109 the computer 104 and the display device 110, respectively, may include USB 3.0 cables as defined by the USB 3.0 Specification, which is incorporated herein by reference in its entirety. The units of information 112 and 118 may include SuperSpeed packets including a SuperSpeed endpoint identifier that identifies a SuperSpeed endpoint (e.g., SuperSpeed endpoint represented by a communication interface 130 of the display device 110).

For example embodiments, a USB endpoint may include a uniquely identified portion of a USB device that is the source or sink of information in a communication flow between a host and a device. A transaction with an USB endpoint may include the delivery of service to that endpoint.

The transmission media 105 and 107 connecting the storage device 106 and the imaging device 108, respectively, may include USB 2.0 cables as defined by the USB 2.0 specification, which is incorporated herein by reference in its entirety. The units of information 114 and 116 may include USB 2.0 packets including USB 2.0 endpoint identifiers that identify USB 2.0 endpoints (e.g., a USB 2.0 endpoint represented by a communication interface 126 of the storage device 106 and/or a communication interface 128 of the imaging device 108).

The intermediate device 102 may exchange information between the computer 104, the storage device 106, the imaging device 108, and the display device 110. In example embodiments, the intermediate device 102 may transfer information through data units (e.g., the data unit 112) with the computer 104 at a relatively faster or higher transfer rate than the intermediate device 102 may transfer the same or similar information through data units (e.g., the unit of information 114) with a connected device (e.g., the storage device 106). To this end, the intermediate device 102 may process a message transferred at one rate so that the message may be delivered to its destination at another rate. Processing the message may include processing communication protocol information associated with the different transfer rates.

For example, when the network 100 employs USB 3.0 and USB 2.0 as communication protocols, the intermediate device 102 may transfer information with the computer 104 at a SuperSpeed transfer rate through SuperSpeed packets. The communication interfaces 122 of the intermediate device 102 may perform certain communication protocol operations in order to transfer that same or similar information with a USB 2.0 device (e.g., the storage device 106 or the imaging device 108) at a USB 2.0 transfer rate through USB 2.0 packets. In this example, information conventionally transferred through USB 2.0 packets at USB 2.0 transfer rates (e.g., when a USB 3.0 hub is used without the example intermediate device 102) may be transferred through SuperSpeed packets at SuperSpeed transfer rates.

In some example embodiments, the intermediate device 102 may provide functionality that is alternative or additional to functionality provide by a USB 3.0 hub. The intermediate device may be, in some example embodiments, or may not be in other example embodiments, a modified USB 3.0 hub. Some example intermediate devices described herein may operate alone or in combination with a USB 3.0 hub.

The example intermediate device 102, including its structure and its functionality may be implemented with hardware, software, and/or a combination of hardware and software. Although FIG. 1 shows the intermediate device 102 as being separate from other entities, the intermediate device 102 may be equally effective when fully or partially implemented by the computer 104 or by another machine or device. For example, the intermediate device 102 may operate as a root hub of the computer 104. For some example embodiments, the intermediate device 102 may be included within a docking station for the computer 104.

The computer 104 is but an example embodiment of a machine that processes data and exchanges information with the intermediate device 102 through the network 100. A description of an example computer and other machines which, in some example embodiments, may be interchanged with the computer 104 are described with respect to FIG. 11 below. For some example embodiments, the computer may operate a USB 3.0 host or a modified USB 3.0 host (neither shown) as communication interfaces 124 that facilitate SuperSpeed and/or USB 2.0 packet transfer through the communication interfaces 124 on behalf of the computer.

The storage device 106 is store digital information. For example, the storage device 106 may include a data structure, volatile and/or non-volatile memory technology, magnetic tape, or any other accessible digital storage medium. For an example embodiment, the storage device 106 includes a peripheral storage device such as a disk drive. For some example embodiments, the storage device 106 may be a USB 2.0 device that includes communication interfaces 126 to facilitate the exchange of USB 2.0 packets with the computer 104 through the intermediate device 102.

The imaging device 108 is to capture visual images and provide the captured visual images to be perceived by a user. In an example embodiment, the imaging device includes a video camera equipped to exchange data with the network 100. In an example embodiment, the imaging device 108 may include a USB 2.0 web camera that having the communication interfaces 128 to transfer USB 2.0 packets related to video image data with the computer 104 through the intermediate device 102.

The display device 110 is to provide a visual display of information to be perceived by a user. In some example embodiments, the display device 110 may further provide audio and/or tactile output to be perceived by the user. Example display devices may include but not be limited to a plasma display, a liquid crystal display (LCD), electronic paper, and/or other display devices known in the art. For some example embodiments, the display device may be a USB 3.0 device that includes the communication interfaces 130 to exchange SuperSpeed packets related to display data with the computer through the intermediate device 102.

Figure 2:
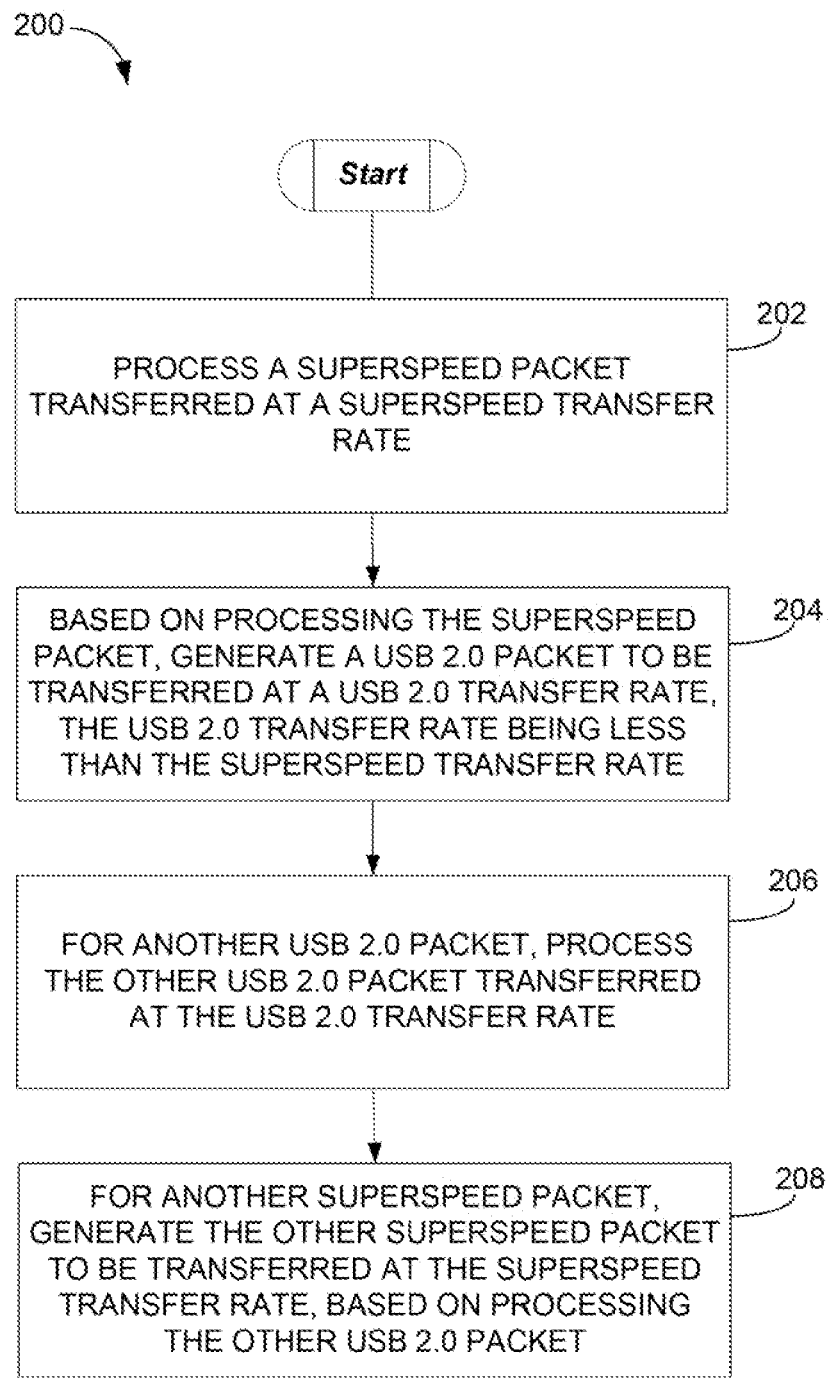
FIG. 2 is a flow diagram illustrating an example method for packet transfer, in accordance with example embodiments.

FIG. 2 is a flow diagram illustrating an example method 200 for packet transfer, in accordance with example embodiments. For some example embodiments, the intermediate device 102 of FIG. 1 may perform operations of the example method 200 as part of a process of exchanging of information between the computer 104 and a USB 2.0 device such as the storage device 106.

In an example embodiment, the computer 104 of FIG. 1 may wish to request information from or to provide information to the storage device 106. The computer 104 may start an exchange of information by transmitting a SuperSpeed packet to the intermediate device 102 over the transmission media 103.

At block 202, the example method 200 may include processing a SuperSpeed packet transferred at a SuperSpeed transfer rate.

At block 204, the example method 200 may include generating a USB 2.0 packet, based on the processing of the SuperSpeed packet, to be transferred at a USB 2.0 transfer rate, the USB 2.0 transfer rate being less than the SuperSpeed transfer rate.

Once the intermediate device 102 of FIG. 1 has processed and generated the USB 2.0 packet as in blocks 202 and 204, the intermediate device 102 may transfer the USB 2.0 packet to the storage device 106.

In an example embodiment, the storage device 106 may wish to request information from or to provide information to the computer 104. To that end, the storage device 106 may transmit a USB 2.0 packet to the intermediate device 102.

At block 206, for another USB 2.0 packet, the example method 200 may include processing the other USB 2.0 packet transferred at the USB 2.0 transfer rate.

At block 208, for another SuperSpeed packet, the example method 200 may include generating the other SuperSpeed packet to be transferred at the SuperSpeed transfer rate, based on the processing of the other USB 2.0 packet.

Continuing the example, once the intermediate device 102 of FIG. 1 has processed and generated the other SuperSpeed packet as in blocks 206 and 208, the intermediate device 102 may transfer the other SuperSpeed packet to the computer 104.

Alternatively or additionally, the intermediate device 102 may perform example methods to generate multiple USB 2.0 packets based on processing multiple SuperSpeed packets received from the computer 104. The intermediate device 102 may distribute several of the multiple USB 2.0 packets to multiple USB 2.0 devices (e.g., the storage device 106 and the imaging device 108) depending on the destination or endpoint to which each SuperSpeed packet and associated USB 2.0 packet is directed. In the reverse direction, the intermediate device 102 may receive multiple USB 2.0 packets from multiple USB 2.0 devices, process those USB 2.0 packets, and generate multiple SuperSpeed packets to be transferred to the computer 104, based on processing the multiple USB 2.0 packets.

Figure 3:
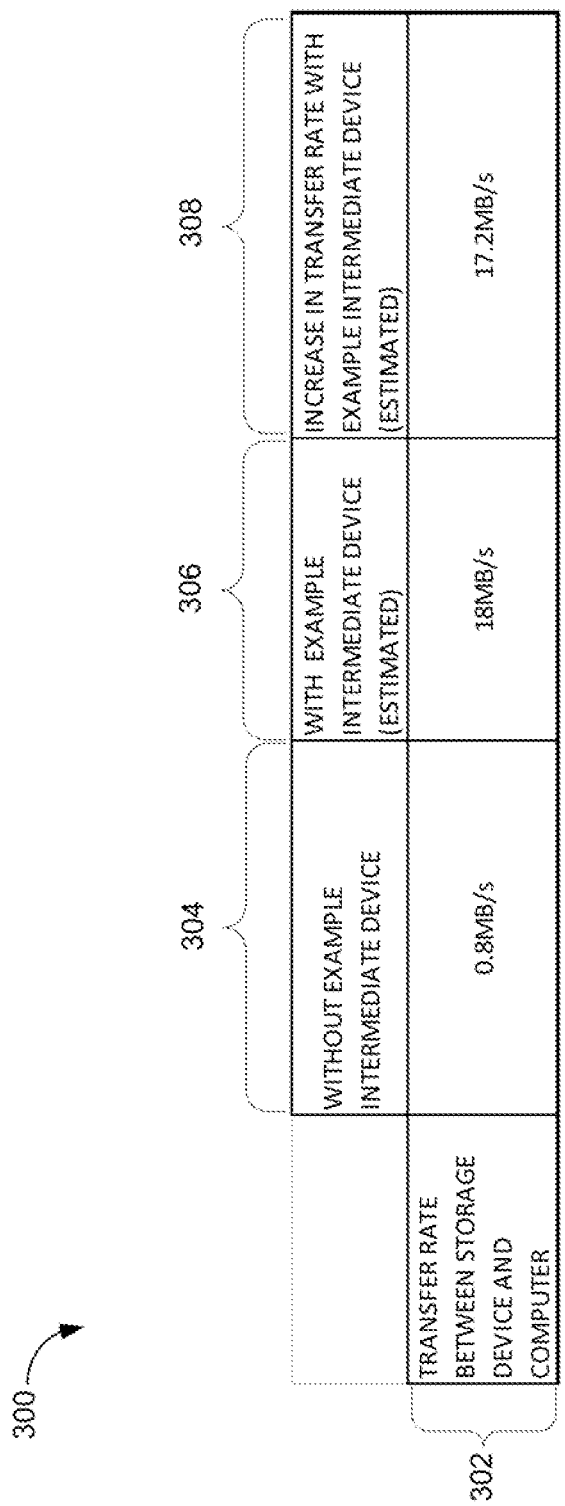
FIG. 3 is a chart illustrating an estimated transfer rate, in accordance with example embodiments.

Through the practice of the example methods described herein, a transfer rate performance between a host and a USB 2.0 device may be enhanced as illustrated by example through FIG. 3.

FIG. 3 is a chart 300 illustrating an estimated transfer rate, in accordance with example embodiments. A transfer rate may represent a quantity of data transferred over a period of time. The transfer rate is estimated for a transfer of information between a computer (e.g., the computer 104 of FIG. 1) and a USB 2.0 storage device (e.g., the storage device 106 of FIG. 1). The estimation is based on a test configuration in which the USB 2.0 storage device (e.g., the storage device 106 of FIG. 1) and a USB 2.0 imaging device (the imaging device 108 of FIG. 1) simultaneously exchange USB 2.0 packets with the computer (e.g., the computer 104 of FIG. 1) through an example intermediate device (e.g., the intermediate device 102 of FIG. 1) that performs operations of the example methods described herein.

In FIG. 3, a measured transfer rate between the USB 2.0 storage device and the computer is shown to be 0.8 MB/s (see row 302, column 304) for a first scenario in which a USB 3.0 hub is employed and an example intermediate device is not. In the first scenario, the imaging device and the storage device may share the 480 Mbps bandwidth (e.g., the USB 2.0 transfer rate) available between the host and the USB 3.0 hub. An estimated transfer rate between the USB 2.0 storage device and the computer is shown to be 18 MB/s (see row 302, column 306) for a second scenario in which the example intermediate device is employed.

An estimated increase in transfer rate is shown to be 17.2 MB/s (see row 302, column 308), which equates to a 2150% performance improvement for the second scenario in which the example intermediate device is employed.

Figure 4:
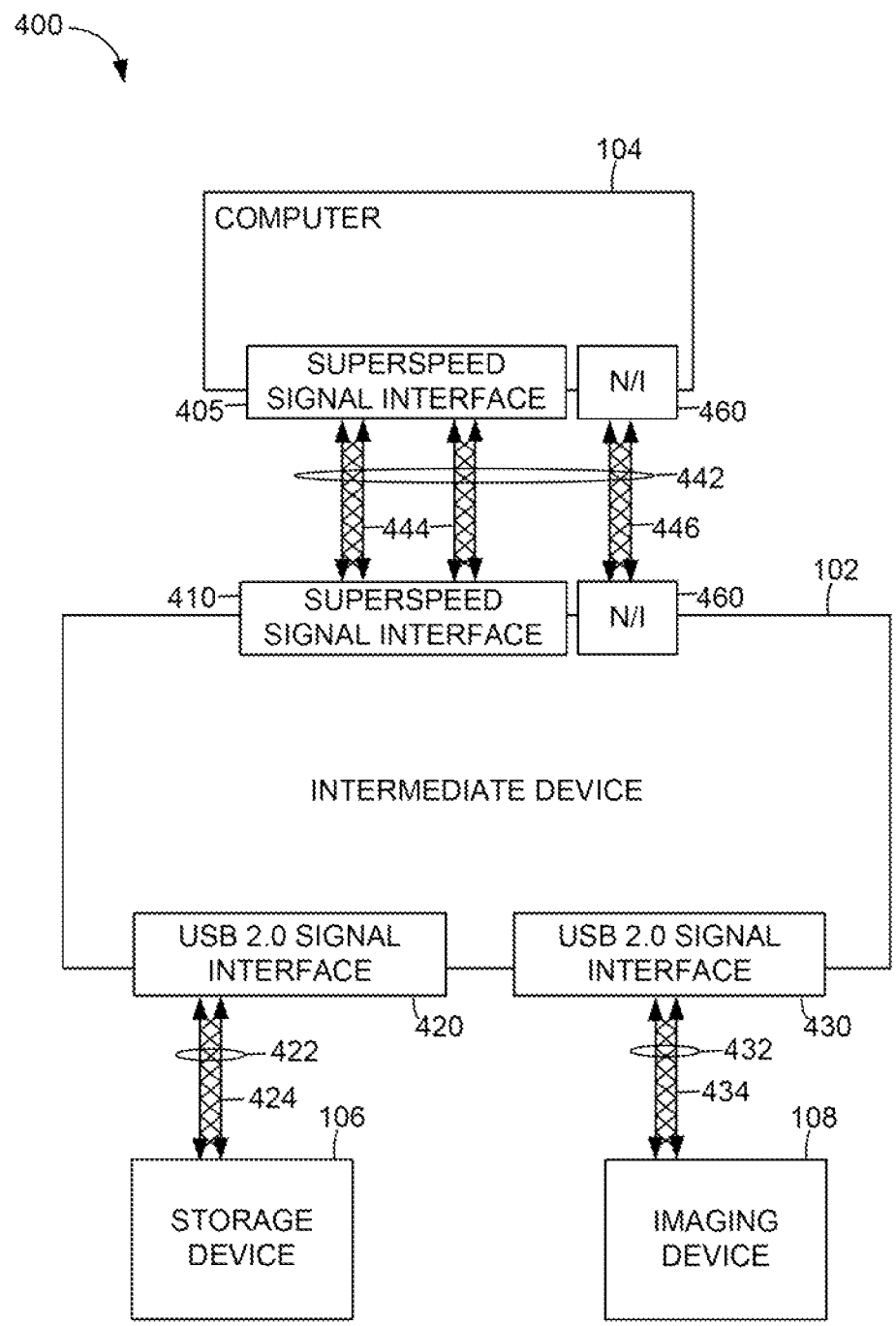
FIG. 4 is a block diagram illustrating an example network, in accordance with example embodiments.

Not only may the estimated transfer rate be realized through practice of the example embodiments, utilization of USB 2.0 related hardware and USB 2.0 packet processing resources may be avoided through the practice of the example embodiments, as discussed with respect to FIG. 4.

FIG. 4 is a block diagram illustrating an example network 400, in accordance with example embodiments. FIG. 4 illustrates an absence, in an example embodiments, of the use of USB 2.0 communication interfaces (not shown) to exchange information between the computer 104 and the intermediate device 102, in a network that uses USB communication protocol.

The example network 400 is shown to include the intermediate device 102 coupled with: the computer 104 through a USB 3.0 cable 442, the storage device 106 through a USB 2.0 cable 422, and the imaging device 108 through another USB 2.0 cable 432. The intermediate device 102, the computer 104, the storage device 106, and the imaging device 108 may be the same, or similar, in structure and/or function as those described with respect to FIG. 1.

As example communication interfaces, the intermediate device 102 is shown to include a SuperSpeed signal interface 410 and USB 2.0 signal interfaces 420 and 430. The computer 104 is also shown to include a SuperSpeed signal interface 405.

The SuperSpeed signal interfaces 410 and 405 of the intermediate device and the computer 104, respectively, may be communication interfaces that connect with and transfer SuperSpeed signals over the USB 3.0 cable 442. In an example embodiment, the SuperSpeed signal interfaces 410 and 405 may each include a SuperSpeed PHY to encode, transmit, receive, and decode SuperSpeed signals in accord with the USB 3.0 specification.

The USB 3.0 cable 442 may include, among other things, three twisted pairs. Two of the twisted pairs may provide a SuperSpeed data path 444, one for the transmit path and one for the receive path. The remaining twisted pair may provide a USB 2.0 data path 446. For some example embodiments, the USB 2.0 data path 446 may not be used when only Super-Speed packets are exchanged between the SuperSpeed signal interface 405 of the computer 104 and the SuperSpeed signal interface 410 of the intermediate device 102.

The USB 2.0 signal interfaces 420 and 430 may be communication interfaces that transfer USB 2.0 signals over the USB 2.0 cables 442 with the storage device 106 and over the USB 2.0 cable 432 with the imaging device 108. In an example embodiment, the USB 2.0 signal interfaces 420 and 430 may include a USB 2.0 PHY that may encode, transmit, receive, and decode USB 2.0 signals in accord with the USB 2.0 specification. The USB 2.0 cables 422 and 432 may each include, among other things, a twisted pair to provide the USB 2.0 data paths 424 and 434.

An absence of USB 2.0 signal interfaces connecting the USB 2.0 data path 446 between the computer the intermediate device may be noted by the blocks labeled as no connection (N/C) 460. As a result of the example computer 104 and/or the example intermediate device 102 operating without these USB 2.0 signal interfaces, significant design constraints related to material selection, footprint, energy consumption, cost, and other design issues associated with utilizing a USB 2.0 signal interface may be avoided.

Since the intermediate device 102 may support the computer 104 to transfer USB 2.0 related information through SuperSpeed packets, rather than through USB 2.0 packets. The computer 104 may fully or partially avoid interacting with USB 2.0 packets. For example, the computer 104 may avoid executing code, storing data, and consuming energy related to managing USB 2.0 endpoints and processing packets.

For some example embodiments, the example intermediate device 102 may offload the computer 104 of these USB 2.0 related expenses. For example, the intermediate device 102 may manage USB 2.0 endpoint enumeration, generate all USB 2.0 packets, and/or manage distribution of USB 2.0 packets to various USB 2.0 devices connected with the computer 104 through the intermediate device 102.

FIGS. 5-10 are referred to below where it is discussed how example intermediate devices may process and generate packets such that USB 2.0 device related information may be transferred at SuperSpeed rates between host (e.g., operating on a computer) and an example intermediate device.

Figure 5:
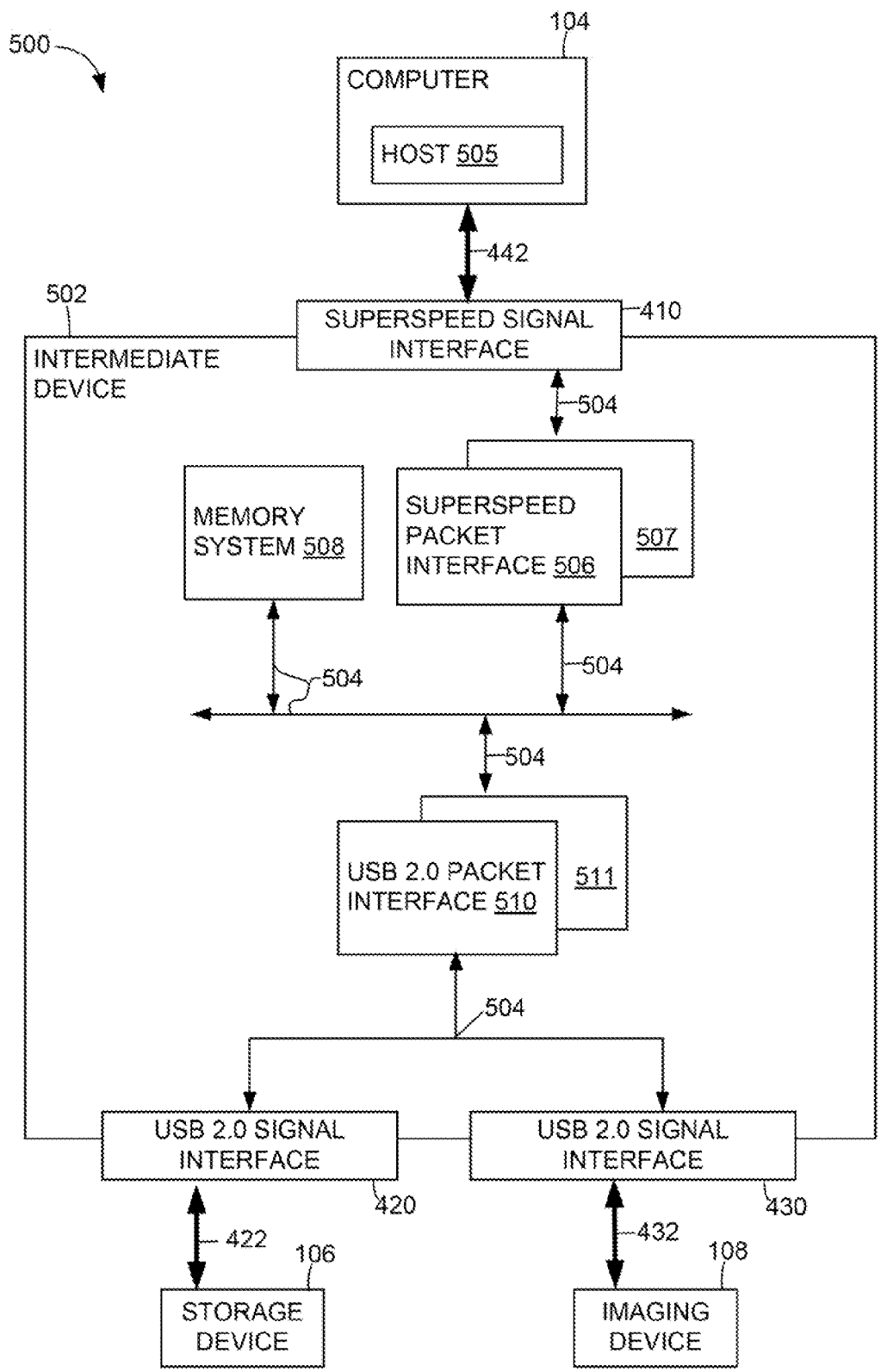
FIG. 5 is a block diagram illustrating an example intermediate device within an example network, in accordance with example embodiments.

FIG. 5 is a block diagram illustrating an example intermediate device 502 within an example network 500, in accordance with example embodiments.

The network 500 is shown to include the intermediate device 502 coupled to a computer 104, a storage device 106 and an imaging device 108. The example intermediate device 502 is shown to be coupled with the computer 104 through a SuperSpeed signal interface 410 and a USB 3.0 cable 442. The example intermediate device 502 is shown to be coupled with the storage device 106 through a USB 2.0 signal interface 420 and USB 2.0 cable 422, and with the imaging device 108 through another USB 2.0 signal interface 430 and another USB 2.0 cable 432. The computer 104, the storage device 106, the imaging device 108, the USB 3.0 cable 422, and the USB 2.0 cables 432 may be the same or similar in structure and/or function as those described with respect to FIGS. 1 and 4.

The example intermediate device 502 may transfer information with the computer 104 at a SuperSpeed transfer rate through SuperSpeed packets and may transfer that same or similar information (e.g., corresponding information) with a USB 2.0 device (e.g., the storage device 106 or the imaging device 108) at a USB 2.0 transfer rate through USB 2.0 packets. The example intermediate device 502 may provide this functionality by associating SuperSpeed packets of the computer with USB 2.0 packets of the USB 2.0 device, based on USB 2.0 endpoints identifiers encoded within the SuperSpeed packets and the USB 2.0 packets.

The intermediate device 502 is shown to include a bus system 504 that may electrically and/or communicatively couple, to one another, the SuperSpeed signal interface 410, SuperSpeed packet interfaces 506 and 507, a memory system 508, USB 2.0 packet interfaces 510 and 511, and the USB 2.0 signal interfaces 420 and 430. The SuperSpeed signal interface 410 and the USB 2.0 signal interfaces 420 and 430 may be the same or similar in structure and/or function to those described with respect to FIG. 4.

The SuperSpeed packet interfaces 506 and 507 may transfer SuperSpeed packets through the SuperSpeed signal interface 410 and the USB 3.0 cable 442. The USB 2.0 packet interfaces 510 and 511 may transfer USB 2.0 packets through the USB 2.0 signal interfaces 420 and 430 and the USB 2.0 cables 422 and 432.

The functionality described for the SuperSpeed packet interfaces 506 and 507, and the USB 2.0 packet interfaces 510 and 511 may be implemented through hardware, software or a combination of hardware and software.

For some example embodiments, the SuperSpeed packet interfaces 506 and 507, and the USB 2.0 packet interface 510 and 511 may use the bus system 504 to exchange signals to coordinate information exchange involving both SuperSpeed and USB 2.0 packets. The SuperSpeed packet interfaces 506 and 507, and/or the USB 2.0 packet interface 510 and 511 may access the memory system 508 through the bus system 504 to read or write communication protocol information related to SuperSpeed and/or USB 2.0 packets such as payload data, control information, endpoint identifiers, or any other communication protocol information.

The computer 104 is shown to include a host 505. For some example embodiments, the computer 104 may operate the host 505 to provide all or a portion of host functionality outlined for a USB 3.0 host in the USB 3.0 specification. For example, the host 505 may detect the attachment and removal of USB devices, manage control, status, and information exchanges between the host and USB 3.0 and/or USB 2.0 devices connected to the network 500. In an example embodiment, the host 505 may enumerate and manage information exchange with USB 2.0 endpoints of the storage device 106 and the imaging device 108. In various example embodiments, the host 505 may initiate a transaction with a USB 2.0 endpoint of the storage device 106 through transferring to the intermediate device 502, a SuperSpeed packet encoding a USB 2.0 endpoint identifier.

For an example communication flow towards the storage device 106, the SuperSpeed packet interface 506 of the intermediate device 502 may process the SuperSpeed packet to obtain the USB 2.0 endpoint identifier identifying the USB 2.0 endpoint. The USB 2.0 packet interface 510 may then generate a USB 2.0 packet including the USB 2.0 endpoint.

For a communication flow towards the computer 104, The USB 2.0 packet interface 510 may process a USB 2.0 packet to obtain the same or a different USB 2.0 endpoint identifier identifying the same or a different USB 2.0 endpoint. The SuperSpeed packet interface may then generate a SuperSpeed packet including the same or the different USB 2.0 endpoint identifier.

The SuperSpeed packet interface 506 and the USB 2.0 packet interface may 510 coordinate as a packet interface pair to transfer, process, and generate packets that are tied to a common USB 2.0 endpoint. For some example embodiments, the SuperSpeed packet interface 507 and the USB 2.0 packet interface 511 may constitute a packet interface pair such that the example intermediate device employs multiple packet interface pairs.

In an example embodiment, a packet interface pair may be dedicated to traffic to and from a single USB 2.0 signal interface. For example, a packet interface pair including the USB 2.0 packet interface 510 and the SuperSpeed packet interface 506 may be dedicated to the signal interface 420. Another packet interface pair including the USB 2.0 packet interface 511 and the SuperSpeed packet interface 507 may be dedicated to the USB 2.0 signal interface 430. In an example embodiment, both packet interface pairs may be coupled to the SuperSpeed signal interface 410 for transferring SuperSpeed packets to the host 505. For some example embodiments, multiple packet interfaces of the example intermediate device may operate in parallel.

Figure 6:
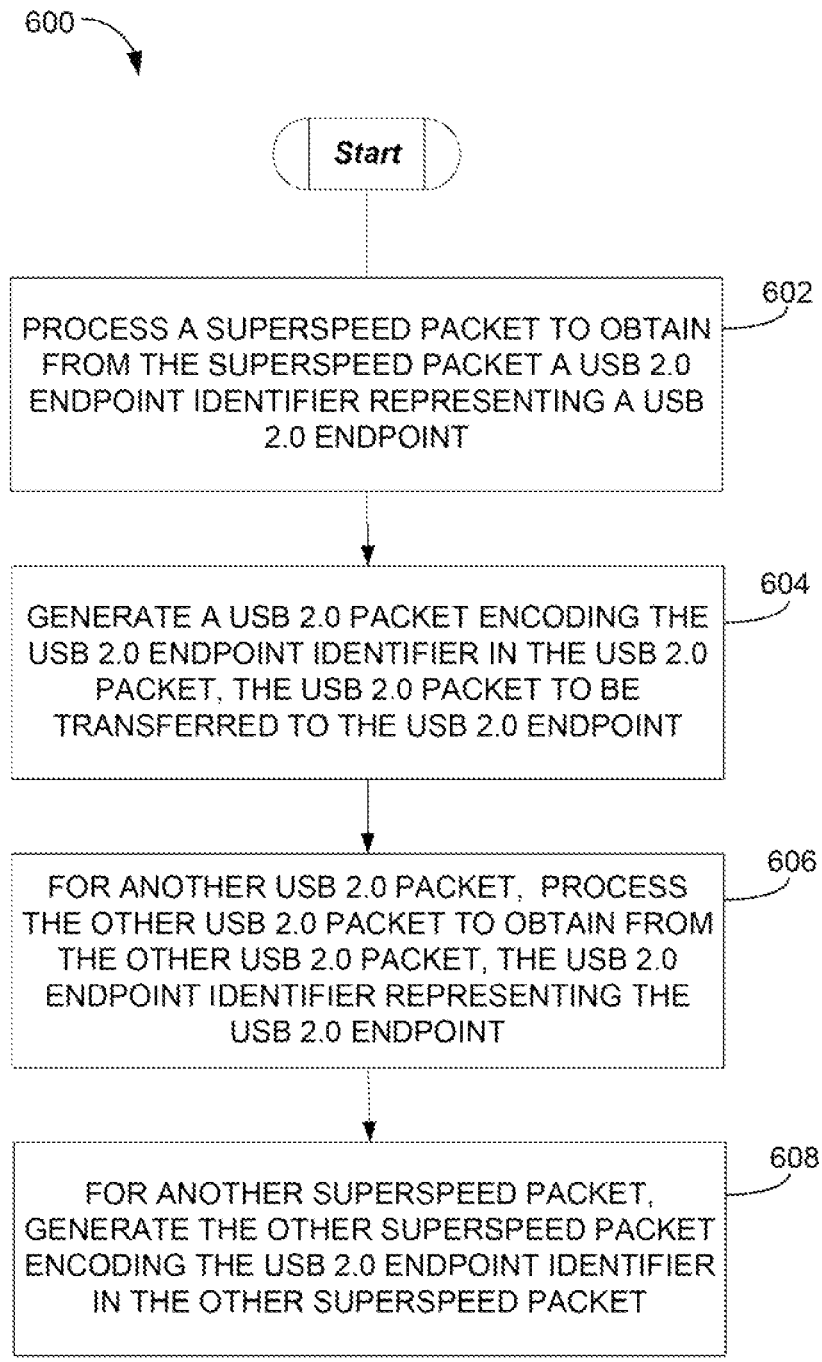
FIG. 6 is a flow diagram illustrating an example method for packet transfer, in accordance with example embodiments.

FIG. 6 is a flow diagram illustrating an example method 600 for packet transfer, in accordance with example embodiments.

As described above with respect to FIG. 5, the host 505 may, as part of a transaction with the storage device 106, transfer a SuperSpeed packet to the intermediate device 502.

At block 602, the example method 600 may include processing a SuperSpeed packet, transferred at a SuperSpeed transfer rate (e.g., a SuperSpeed transfer rate), to obtain from the SuperSpeed packet a USB 2.0 endpoint identifier representing a USB 2.0 endpoint.

Referring to FIG. 5, the SuperSpeed packet interface 506 may process the SuperSpeed packet to obtain the USB 2.0 endpoint identifier and may use the bus system 504 to place the endpoint identifier in the memory system 508 to be accessed later.

At block 604, the example method 600 may include generating a USB 2.0 packet encoding the USB 2.0 endpoint identifier in the USB 2.0 packet, the USB 2.0 packet to be transferred at USB 2.0 transfer rate to the USB 2.0 endpoint.

Following the arrival of the SuperSpeed packet, the SuperSpeed packet interface 506 may signal the USB 2.0 packet interface 510 to obtain the endpoint identifier and/or other packet related information from the memory system 508. The USB 2.0 packet interface 510 of FIG. 5 may generate the USB 2.0 packet that encodes the endpoint identifier of the USB 2.0 endpoint of the storage device 106.

The USB 2.0 packet interface 510 may provide the generated USB 2.0 packet to the USB 2.0 signal interface 420 to be transferred at the USB 2.0 transfer rate to the USB 2.0 endpoint of storage device 106.

For some example embodiments, the SuperSpeed packet that the host 505 oldie computer 104 transferred to the intermediate device may include a request for information from the USB 2.0 endpoint. The generated USB 2.0 packet transmitted to the storage device 106 may include that request for information. The USB 2.0 endpoint may, for example, provide a response to the request for information in another USB 2.0 packet. The storage device 106 may transmit this other USB 2.0 packet to the intermediate device 502.

However, it may be noted that for some example embodiments, a USB 2.0 packet transmitted to the intermediate device 502 by a USB 2.0 device may not include a response to a request for information.

At block 606, for another USB 2.0 packet, the example method 600 may include processing the other USB 2.0 packet transferred at the USB 2.0 transfer rate to obtain from the other USB 2.0 packet, a USB 2.0 endpoint identifier representing a USB 2.0 endpoint At block 608, for another SuperSpeed packet, the example method 600 may include generating the other SuperSpeed packet encoding the USB 2.0 endpoint identifier in the other SuperSpeed packet In an example embodiment, when the storage device 106 of FIG. 5 transfers the other USB 2.0 packet, the USB 2.0 packet interface 510 may obtain, from the other USB 2.0 packet, the USB 2.0 endpoint identifier. The USB 2.0 packet interface 510 may place the endpoint identifier and/or transaction data in the memory system and signal the SuperSpeed packet interface to the access memory system 508 for the information. The SuperSpeed packet interface 506 may then generate the other SuperSpeed packet that encodes, among other things, the USB 2.0 endpoint identifier. The SuperSpeed signal interface 410 may then transfer the other SuperSpeed packet to the host 505.

In various example embodiments, the SuperSpeed packet, the USB 2.0 packet, the other USB 2.0 packet, and the other SuperSpeed packet belong to a common transaction managed by the host 505 of the computer in FIG. 1. For other example embodiments, the other USB 2.0 packet and the other SuperSpeed packet may not belong to the common transaction.

Through the example embodiments and operations described with respect to FIGS. 5 and 6, transfer rate performance may be enhanced for information transfer between a USB 2.0 device and a computer. FIG. 3 and its description above illustrate an example of an estimated increase in transfer rate when USB 2.0 related information is transferred between the computer and the intermediate device at SuperSpeed transfer rates.

Figure 7:
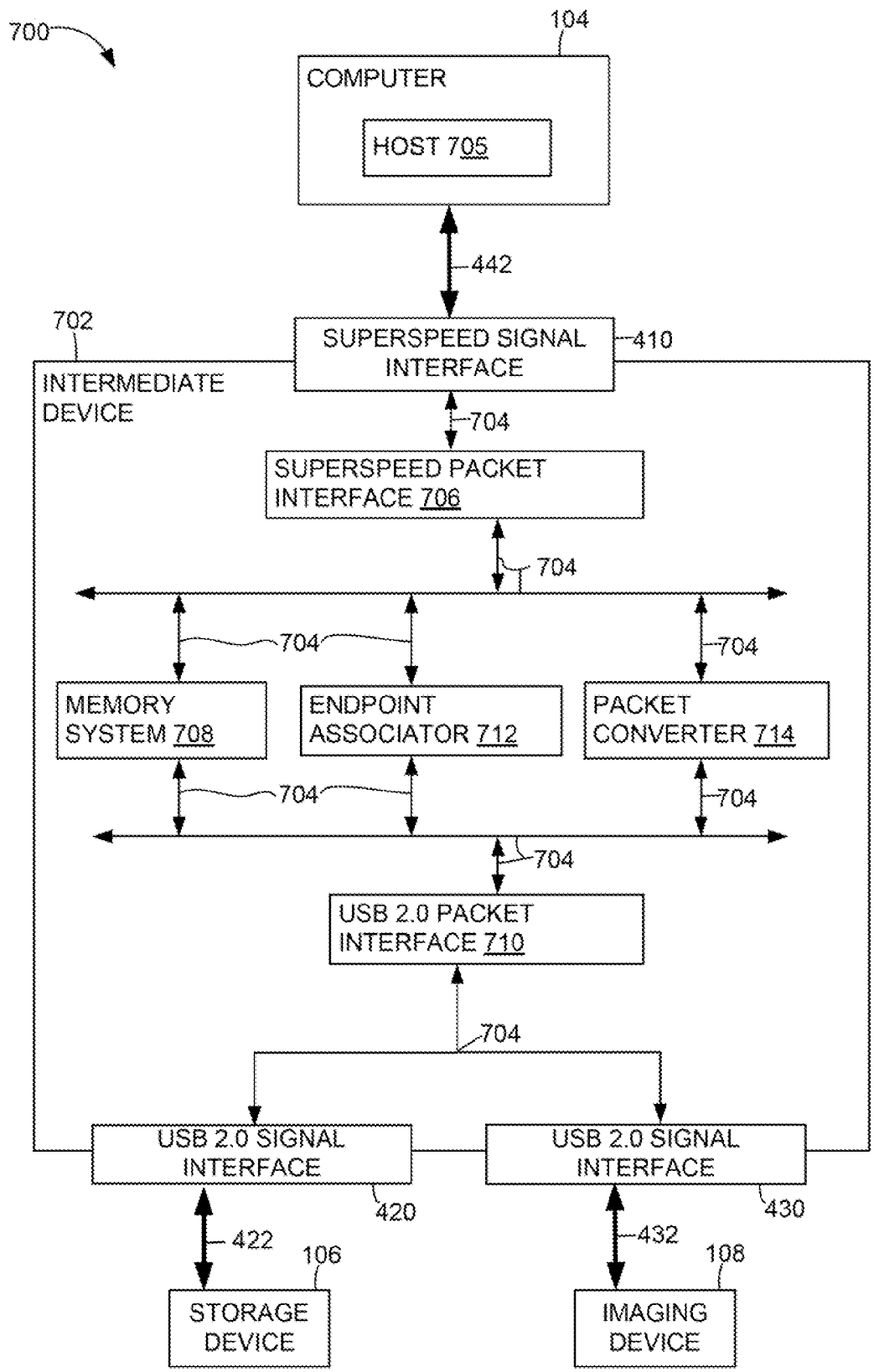
FIG. 7 is a block diagram illustrating an example intermediate device within an example network, in accordance with example embodiments.

Additionally, as described with respect to FIG. 4, the use, by the computer and/or the intermediate device, of a USB 2.0 signal interface (e.g., a USB 2.0 PHY) and associated temporal, footprint, and energy costs, may be avoided through deployment of the example embodiments. FIG. 7 relates to another example embodiment of the intermediate device of FIG. 1.

FIG. 7 is a block diagram illustrating an example intermediate device within an example network, in accordance with example embodiments.

The network 700 shows the intermediate device 702 coupled to the computer 104, the storage device 106, and the imaging device 108. The example intermediate device 702 is shown to be coupled to the computer 104 through a SuperSpeed signal interface 410 and a USB 3.0 cable 442. The example intermediate device 702 is shown to be coupled with the storage device 106 through a USB 2.0 signal interface 420 and USB 2.0 cable 422, and with the imaging device 108 through another USB 2.0 signal interface 430 and another USB 2.0 cable 432. The computer 104, the storage device 106, the imaging device 108, the USB 3.0 cable 442, and the USB 2.0 cables 422 and 432 may be the same or similar in structure and/or function as those described with respect to FIGS. 1 and 4.

The computer 104 is shown to include a host 705. For some example embodiments, the computer 104 may operate the host 705 to provide all or a portion of host functionality outlined for a USB 3.0 host in the USB 3.0 specification. For example, the host 705 may detect the attachment and removal of USB devices, manage control, status, and information exchanges between the host and USB 3.0 and/or USB 2.0 devices connected to the network 700.

The intermediate device 702 may transfer certain information with the computer 104 at a SuperSpeed transfer rate through SuperSpeed packets and may transfer that same or similar information with a USB 2.0 device (e.g., the storage device or the imaging device) at a USB 2.0 transfer rate through USB 2.0 packets.

The example intermediate device 702 of FIG. 7 may provide this functionality through converting SuperSpeed packets to and from USB 2.0 packets and based on associating SuperSpeed endpoints encoded within the SuperSpeed packets with USB 2.0 endpoints encoded within the USB 2.0 packets.

The intermediate device 702 is shown to include a bus system 704 that may electrically and/or communicatively couple to one another a SuperSpeed signal interface 410, a SuperSpeed packet interface 706, a memory system 708, an endpoint associator 712, a packet converter 714, a USB 2.0 packet interface 710, and USB 2.0 signal interfaces 420 and 430, which may exchange signals over the bus system 704 to coordinate communication flows involving both SuperSpeed and USB 2.0 packets.

The SuperSpeed signal interface 410 and the USB 2.0 signal interfaces 420 and 430 may be the same or similar in structure and/or function to those described with respect to FIG. 4.

The SuperSpeed packet interface 706 may process SuperSpeed packets to obtain SuperSpeed endpoint identifiers, and generate SuperSpeed packets to be transmitted over the USB 3.0 cable 442 by the SuperSpeed signal interface 410. The USB 2.0 packet interface 710 may process USB 2.0 packets to obtain USB 2.0 endpoint identifiers, and generate USB 2.0 packets to be transmitted over the USB 2.0 cables 422 and 432 by the USB 2.0 signal interface 420 and 430 respectively.

The functionality described for the SuperSpeed packet interface 706, the endpoint associator 712, the packet converter 714, the memory system 708, and the USB 2.0 packet interface 710 may be implemented through hardware, software, or a combination of hardware and software.

The endpoint associator 712 may link SuperSpeed endpoints with USB 2.0 endpoints through associating SuperSpeed endpoint identifiers with USB 2.0 endpoint identifiers. For example, the endpoint associator 712 may perform an on-the-fly calculation and/or access the memory system 708 through the bus system 704 to determine a USB 2.0 endpoint identifier that is associated with a SuperSpeed endpoint identifier.

For some example embodiments, the endpoint associator 712 may have previously generated a map linking SuperSpeed endpoints to USB 2.0 endpoints. The endpoint associator 712 may generate such a map based on an endpoint enumeration of SuperSpeed endpoints and corresponding USB 2.0 endpoints. For example, when a USB 3.0 host operated by the computer 104 enumerates SuperSpeed endpoints through the intermediate device 702 the endpoint associator 712 may generate a mapping of those SuperSpeed endpoints to USB 2.0 endpoints known to be connected with the intermediate device 702.

The endpoint associator 712 may also perform the reverse operations in which the endpoint associator determines a SuperSpeed endpoint identifier associated with a USB 2.0 endpoint identifier.

The packet converter 714 may convert or translate a SuperSpeed packet (e.g., the original packet) into a USB 2.0 packet (e.g., the converted packet) and convert or translate a USB 2.0 packet (e.g., the original packet) into a SuperSpeed packet (e.g., the converted packet), such that the converted packet corresponds to or equates to the original packet.

For some example embodiments, the converting or translating may include converting or translating between a SuperSpeed packet format and a USB 2.0 packet format. For example, the packet converter 714 may copy information from one Field or bits of a SuperSpeed packet and place the information in another field or bits of a USB 2.0 packet. In various example embodiments, the packet converter 714 may vary, adjust, and/or remove packet field values of the original packet and use the varied, adjusted, or empty values for the converted packet. In some example embodiments, the packet converter 714 may generate a new packet field value to be placed in a packet field of the converted packet.

The packet converter 714 may access the memory system 708 to reference a packet conversion instruction or algorithm that instructs the packet converter on how values of the original packet should be operated upon in order to perform the conversion. The packet converter 714 may also access for operations data of SuperSpeed and USB 2.0 packets that have been placed in the memory system 708 by the SuperSpeed packet interface 706 and/or the USB 2.0 packet interface 710.

Figure 8:
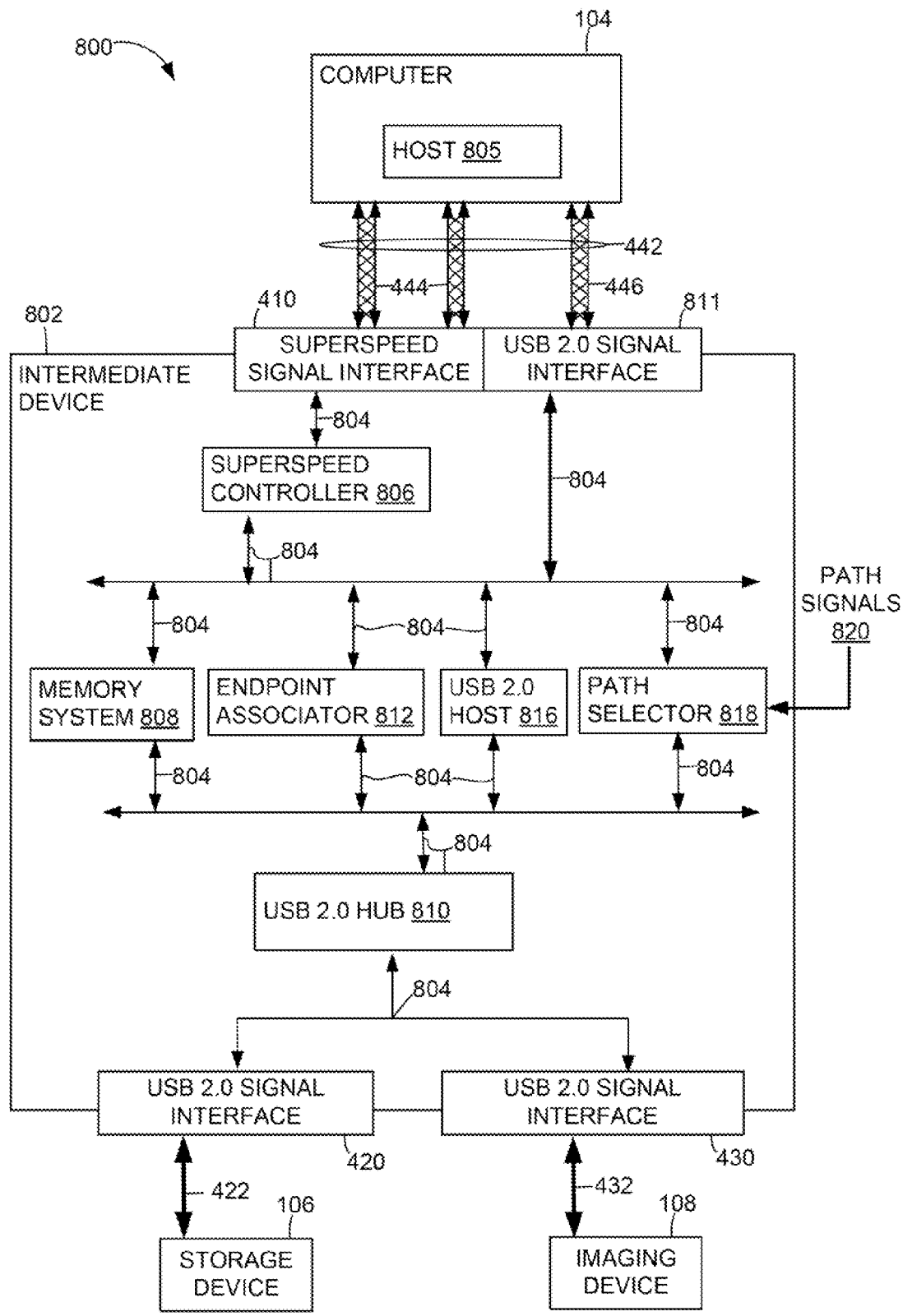
FIG. 8 is a block diagram illustrating an example intermediate device within an example network, in accordance with example embodiments.

FIG. 8 relates to another example intermediate device of FIG. 1. Example methods 900 and 1000 of packet transfer that may be implemented by an example intermediate device of FIGS. 7 and/or 8 are then discussed with respect to FIGS. 9 and 10.

FIG. 8 is a block diagram illustrating an example intermediate device 802 within an example network 800, in accordance with example embodiments.

The network 800 shows the intermediate device 802 coupled to the computer 104, the storage device 106, and the imaging device 108. The example intermediate device 802 is shown to be coupled to the computer 104 through a SuperSpeed signal interface 410, a USB 2.0 signal interface 811, and a USB 3.0 cable 442. The example intermediate device 802 is shown to be coupled with the storage device 106 through a USB 2.0 signal interface 420 and USB 2.0 cable 422, and with the imaging device 108 through another USB 2.0 signal interface 430, and another USB 2.0 cable 432. The computer 104, the storage device 106, the imaging device 108, the USB 3.0 cable 442, and the USB 2.0 cables 422 and 432 may be the same or similar in structure and/or function as those described with respect to FIGS. 1 and 4. The USB 3.0 cable 442 may include, among other things, three twisted pairs. Two of the twisted pairs may provide a SuperSpeed data path 444, one for the transmit path and one for the receive path. The remaining twisted pair may provide a USB 2.0 data path 446.

The computer 104 is shown to include a host 805. For some example embodiments, the computer 104 may operate the host 805 to provide all or a portion of host functionality outlined for a USB 3.0 host in the USB 3.0 specification. For example, the host 805 may detect the attachment and removal of USB devices, manage control, status, and information exchanges between the host and USB 3.0 and/or USB 2.0 devices connected to the network 800.

The intermediate device 802 may transfer information with the computer at a SuperSpeed transfer rate through SuperSpeed packets and may transfer that same or similar information with a USB 2.0 device (e.g., the storage device or the imaging device) at a USB 2.0 transfer rate through USB 2.0 packets.

For some example embodiments, the example intermediate device 802 may provide this functionality through linking SuperSpeed transactions with USB 2.0 transactions, based on associating SuperSpeed endpoints encoded within the SuperSpeed packets with USB 2.0 endpoints encoded within the USB 2.0 packets.

The intermediate device 802 is shown to include a bus system 804 that may electrically and/or communicatively couple a SuperSpeed controller 806, a memory system 808, an endpoint associator 812, a USB 2.0 host 816, a path selector 818, and the USB 2.0 hub 810, which may each exchange signals over the bus system 804 to coordinate communication flows involving SuperSpeed and/or USB 2.0 packets.

It may be noted that the functionality described for the SuperSpeed controller 806, the endpoint associator 812, the USB 2.0 host 816, the path selector 818, and the USB 2.0 hub 810 may be implemented through hardware, software, or a combination of hardware and software.

The SuperSpeed signal interface 410 and the USB 2.0 signal interfaces 420 and 430 of FIG. 8 may be the same or similar in structure and/or function those discussed with respect to FIG. 4.

The SuperSpeed controller 806 may represent to the computer 104, an existence of multiple SuperSpeed endpoints for communication. In some example embodiments, the SuperSpeed controller 806 may create, define, and/or otherwise obtain a number of SuperSpeed endpoints based on a number of USB 2.0 endpoints enumerated by the USB 2.0 host 816 (discussed below). For various example embodiments, the SuperSpeed controller 806 may process SuperSpeed packets to obtain SuperSpeed endpoint identifiers, and may generate SuperSpeed packets to be transferred from a SuperSpeed endpoint to the computer 104.

The USB 2.0 host 816 may provide all or a portion of USB 2.0 host functionality outlined by the USB 2.0 specification. For example the USB 2.0 host 816 may detect the attachment and removal of USB 2.0 devices, manage USB 2.0 device control flow between the USB 2.0 host and USB 2.0 devices, manage data flow between the USB 2.0 host 816 and USB 2.0 devices, or provide additional USB 2.0 host functionality. The USB 2.0 host 816 may, for example embodiments, manage the enumeration of and packet transactions for USB 2.0 endpoints of the storage device 106 and the imaging device 108.

In example embodiments, the USB 2.0 host 816 may process received USB 2.0 packets to obtain USB 2.0 endpoint identifiers, and generate USB 2.0 packets to be transmitted by the USB 2.0 signal interfaces 420 and 430. The USB 2.0 host 816 is shown to connect with the USB 2.0 signal interfaces 420 and 430 through the USB 2.0 hub. Alternatively or additionally, the intermediate device may include multiple USB 2.0 hosts that connect with the signal interfaces 420 and 430 without the USB 2.0 hub 810.

The endpoint associator 812 may associate SuperSpeed endpoints with USB 2.0 endpoints through endpoint identifiers. For example, the endpoint associator 812 may obtain a SuperSpeed endpoint identifier and access the memory system 808 through the bus system 804 to identify a USB 2.0 endpoint identifier that is associated with the SuperSpeed endpoint identifier. The endpoint associator 812 may also perform the reverse operations in which the endpoint identifier may determine a SuperSpeed endpoint identifier based on an obtained USB 2.0 endpoint identifier.

The USB 2.0 hub 810 may perform all or a portion of the functionality outlined by the USB 2.0 specification. For example, the USB 2.0 hub may include a hub repeater responsible for connectivity setup and teardown and to support exception handling such as bus fault detection and recovery and connect/disconnect detection. A hub controller of the USB 2.0 hub may provide an interface for host to hub communication. A translation translator of the USB 2.0 hub may respond to high speed split transactions and translate them to full/low speed transactions with full/low speed devices attached to the USB 2.0 hub.

The path selector 818 is to select a path through the intermediate device for USB 2.0 packets, based on a path signal 820. The path selector 818 may provide a control interface for a user (e.g., a computer or human user) to select whether or not to transfer, from the intermediate device 802 to the computer 104, USB 2.0 packet information through a SuperSpeed packet at a SuperSpeed transfer rate.

For example, one path signal (e.g., a value of zero) may cause the path selector 818 to direct a USB 2.0 packet to undergo operations that result in USB 2.0 packet information of the USB 2.0 packet being transferred to the computer 104 through a SuperSpeed packet. That USB 2.0 packet may be directed to the USB 2.0 host 816. The endpoint associator 812 may then link a USB 2.0 endpoint of the USB 2.0 packet with a SuperSpeed endpoint so that the SuperSpeed controller 806 can generate the SuperSpeed packet to be transferred to the computer 104 through the SuperSpeed signal interface 410 and the SuperSpeed data path 444. Another path signal (e.g., a value of one) may cause the path selector 818 to direct the USB 2.0 packet to the USB 2.0 signal interface for forwarding to the computer 104 through the USB 2.0 data path 446.

Figure 9:
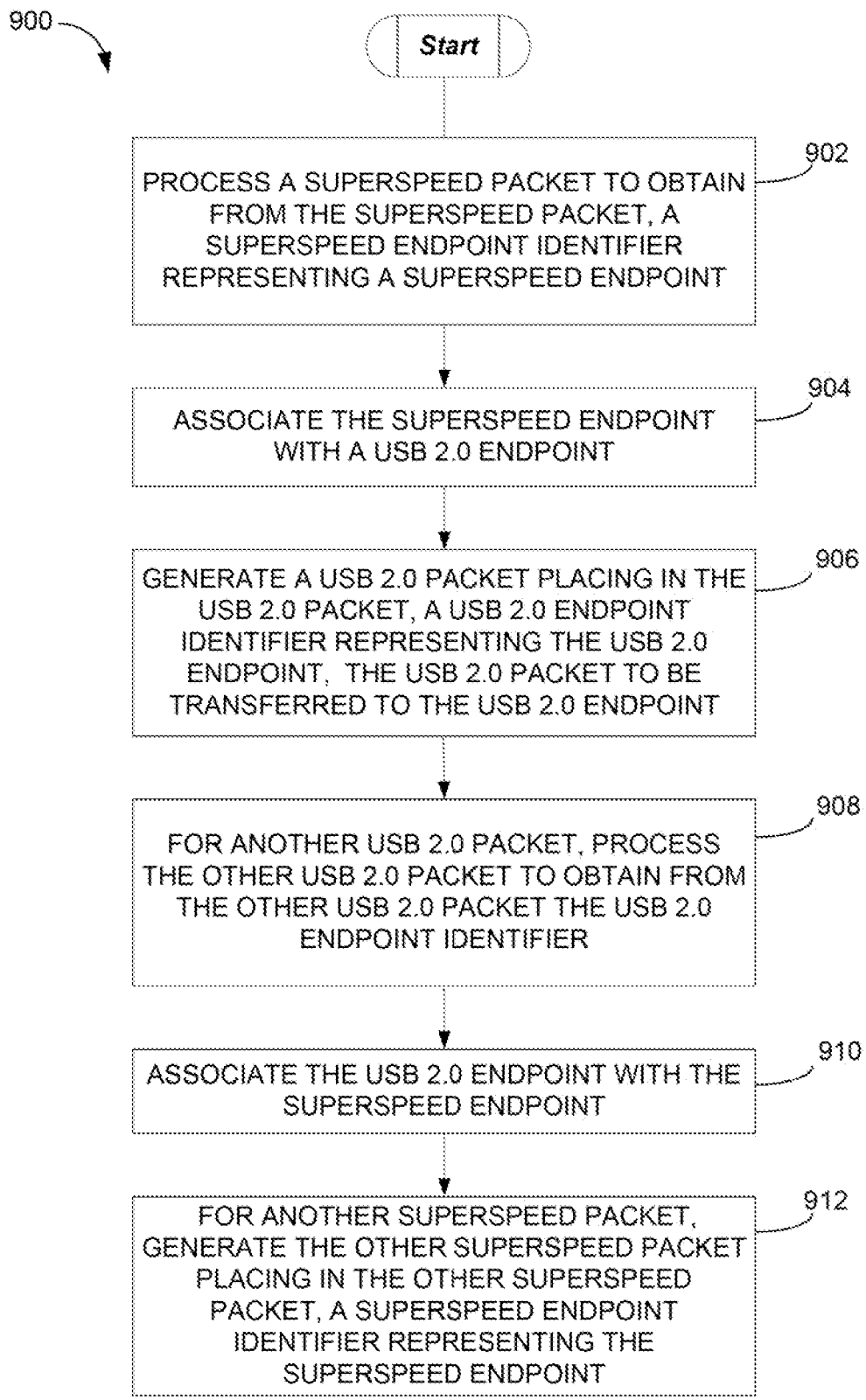
FIG. 9 is a flow diagram illustrating an example method for packet transfer, in accordance with example embodiments.

FIG. 9 is a flow diagram illustrating an example method 900 for packet transfer, in accordance with example embodiments. For some example embodiments, the intermediate device 702 of FIG. 7 may perform operations of the example method 900.

At block 902, the example method 900 may include processing a SuperSpeed packet to obtain from the SuperSpeed packet a SuperSpeed endpoint identifier representing a SuperSpeed endpoint.

Referring to FIG. 7, the SuperSpeed packet interface 706 of the intermediate device 702 may obtain from the SuperSpeed packet, the SuperSpeed endpoint identifier that identifies a SuperSpeed endpoint to which the computer 104 has directed the packet. For some example embodiments, the SuperSpeed packet interface 706 may place the SuperSpeed endpoint identifier in the memory system 708 making the SuperSpeed endpoint identifier accessible by the endpoint associator 712.

At block 904, the example method 900 may include associating the SuperSpeed endpoint with a USB 2.0 endpoint.

For example, the endpoint associator 712 of the intermediate device 702 may access the memory system 708 to associate the SuperSpeed endpoint with a USB 2.0 endpoint through endpoint identifiers. For example, the endpoint associator 712 may reference a data structure stored in the memory system 708 that links the SuperSpeed endpoint with the USB 2.0 endpoint through endpoint identifiers.

At block 906, the example method 900 may include generating a USB 2.0 packet including placing in the USB 2.0 packet, a USB 2.0 endpoint identifier representing the USB 2.0 endpoint, the USB 2.0 packet to be transferred to the USB 2.0 endpoint.

With an association between the SuperSpeed endpoint and the USB 2.0 endpoint made by the endpoint associator 712, the packet converter 714 may perform a packet conversion as part of the generation of the USB 2.0 packet by representing a SuperSpeed field of the SuperSpeed packet as a USB 2.0 field of the USB 2.0 packet.

For example, the packet converter 714 may possess or obtain instructions that when executed (e.g., by a processor of the intermediate device 702) varies or adjusts information of the SuperSpeed packet such that the information may be properly represented in a USB 2.0 packet. The conversion may ensure that the converted USB 2.0 packet complies with the USB 2.0 specification and also corresponds to the SuperSpeed packet from which is was converted.

The intermediate device 702 may similarly convert USB 2.0 packets to SuperSpeed packets in an event that a USB 2.0 packet is received from a USB 2.0 endpoint.

At block 908, for another USB 2.0 packet, the example method 900 may include processing the other USB 2.0 packet to obtain from the other USB 2.0 packet the USB 2.0 endpoint identifier. At block 910, the example method 900 may include associating the USB 2.0 endpoint with the SuperSpeed endpoint.

Referring to FIG. 7, the USB 2.0 packet interface 710 may place the USB 2.0 endpoint identifier obtained from the other USB 2.0 packet into the memory system 708 so that the endpoint associator 712 may use that USB 2.0 endpoint to identify an associated SuperSpeed endpoint identifier. In an example embodiment, the packet converter 714 may perform conversion operations to represent USB 2.0 fields of the other USB 2.0 packet as SuperSpeed fields of the other SuperSpeed packet.

At block 912, for another SuperSpeed packet, the example method 900 may include generating the other SuperSpeed packet including placing in the other SuperSpeed packet, the SuperSpeed endpoint identifier representing the SuperSpeed endpoint.

For an example embodiment, the SuperSpeed packet interface 706 of FIG. 7 may generate the other SuperSpeed packet for the SuperSpeed signal interface 410 to transfer to the computer 104. The other SuperSpeed packet may include SuperSpeed packet field values that were converted from USB 2.0 packet field values.

Figure 10:
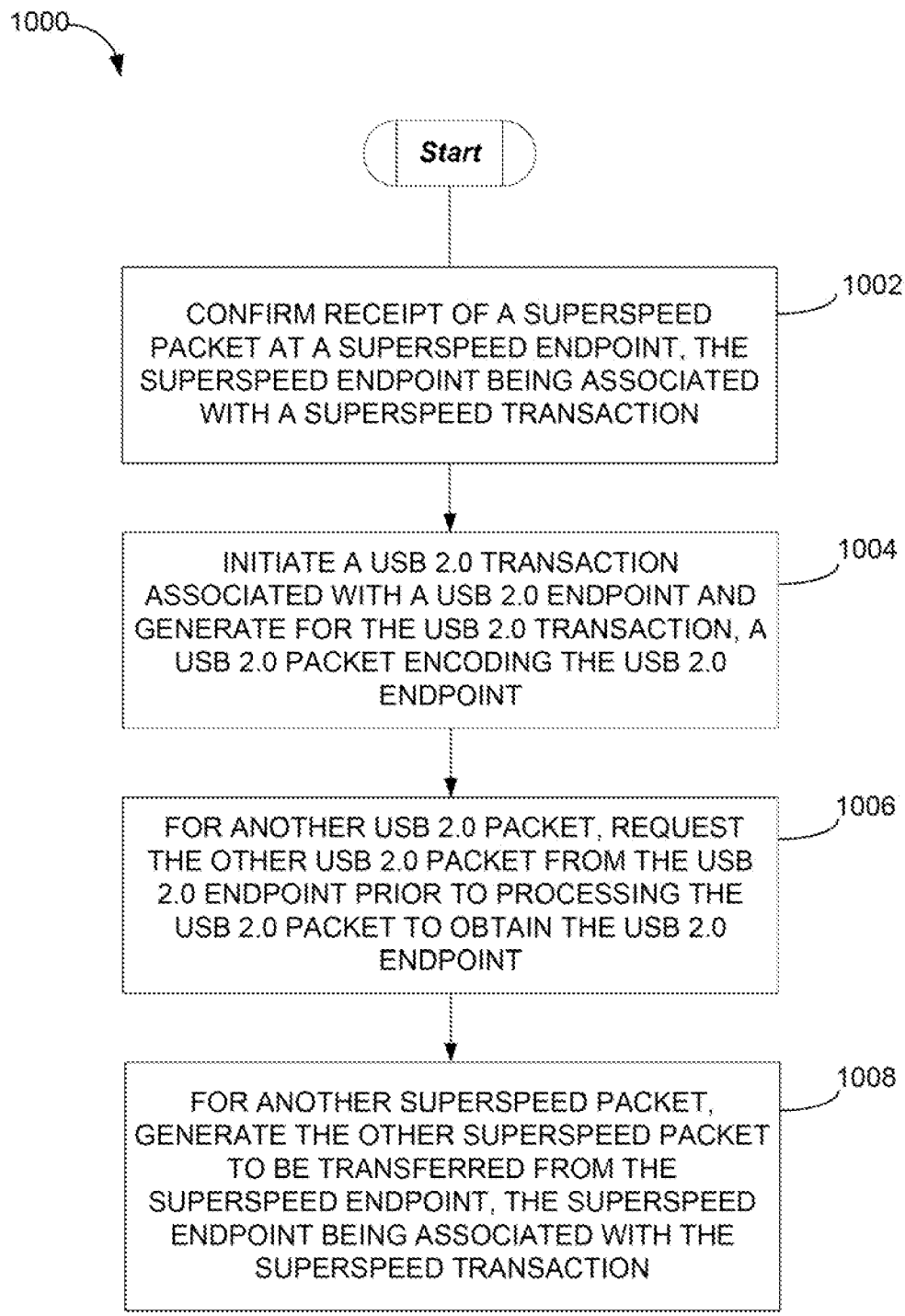
FIG. 10 is a flow diagram illustrating an example method for packet transfer, in accordance with example embodiments.

FIG. 10 is a flow diagram illustrating an example method 1000 for packet transfer, in accordance with example embodiments. For some example embodiments, the example intermediate device 802 of FIG. 8 may perform operations of the example method 1000.

Referring to FIG. 8, the SuperSpeed controller 806 may represent the existence of a SuperSpeed endpoint to a host operated by the computer 104. The host may transmit a SuperSpeed packet to the SuperSpeed endpoint as part of a SuperSpeed transaction.

At block 1002, the example method 1000 may include confirming receipt of a SuperSpeed packet at the SuperSpeed endpoint, the SuperSpeed endpoint being associated with a SuperSpeed transaction.

After performing the example operations of block 1002, the SuperSpeed controller 806 may then provide the SuperSpeed endpoint identifier to the endpoint associator 812, which may associate the SuperSpeed endpoint with a USB 2.0 endpoint (e.g., through associating the SuperSpeed endpoint identifier with the USB 2.0 endpoint identifier). The endpoint associator 812 may in turn provide the associated USB 2.0 endpoint to the USB 2.0 host 816 of FIG. 8, which may perform example operations of block 1004.

At block 1004, the example method 1000 may include initiating a USB 2.0 transaction associated with the USB 2.0 endpoint, and generating a USB 2.0 packet (e.g., encoding the USB 2.0 endpoint) for the USB 2.0 transaction.

In an example embodiment, the USB 2.0 host may initiate the USB 2.0 transaction with a USB 2.0 endpoint of the storage device 106 and may subsequently request a return packet (e.g., another USB 2.0 packet) as part of the USB 2.0 transaction.

At block 1006, for another USB 2.0 packet, the example method 1000 may include requesting the other USB 2.0 packet from the USB 2.0 endpoint prior to processing the USB 2.0 packet to obtain the USB 2.0 endpoint.

In example embodiments, the endpoint associator 812 may associate the obtained USB 2.0 endpoint of the USB 2.0 transaction with the SuperSpeed endpoint of the SuperSpeed transaction.

The SuperSpeed controller 806 may subsequently respond (e.g., with another SuperSpeed packet) to the SuperSpeed packet it received from the host (e.g., see block 1002).

At block 1008, for another SuperSpeed packet, the example method 1000 may include generating the other SuperSpeed packet to be transferred from the SuperSpeed endpoint, the SuperSpeed endpoint being associated with the SuperSpeed transaction.

Thus, the example intermediate device 802 of FIG. 8 may participate in a SuperSpeed transaction between the host and the SuperSpeed controller 806 as well as a USB 2.0 transaction between the USB 2.0 host 816 and a USB 2.0 endpoint of a USB 2.0 device. The example intermediate device 802 may also associate the SuperSpeed transaction with the USB 2.0 transaction to transfer information common to both transactions at the SuperSpeed transfer rate between the host and the intermediate device.

Through the example embodiments and operations described with respect to FIGS. 7, 8, 9, and 10, transfer rate performance may be enhanced for information transfer between a USB 2.0 device and a computer. As previously noted, FIG. 3 and its description above illustrate an example of an estimated increase in transfer rate when USB 2.0 related information is transferred between the computer and the intermediate device at SuperSpeed transfer rates.

Additionally, as described with respect to FIG. 4, the use, by the computer and/or the intermediate device, of a USB 2.0 signal interface (e.g., a USB 2.0 PHY) and associated temporal, footprint, and energy costs, may be avoided through deployment of the example embodiments. Furthermore, the example intermediate devices described herein may offload the computer (e.g., a communication interface of the computer) from performing USB 2.0 related operations such as USB 2.0 endpoint management and USB 2.0 protocol processing.

Figure 11:
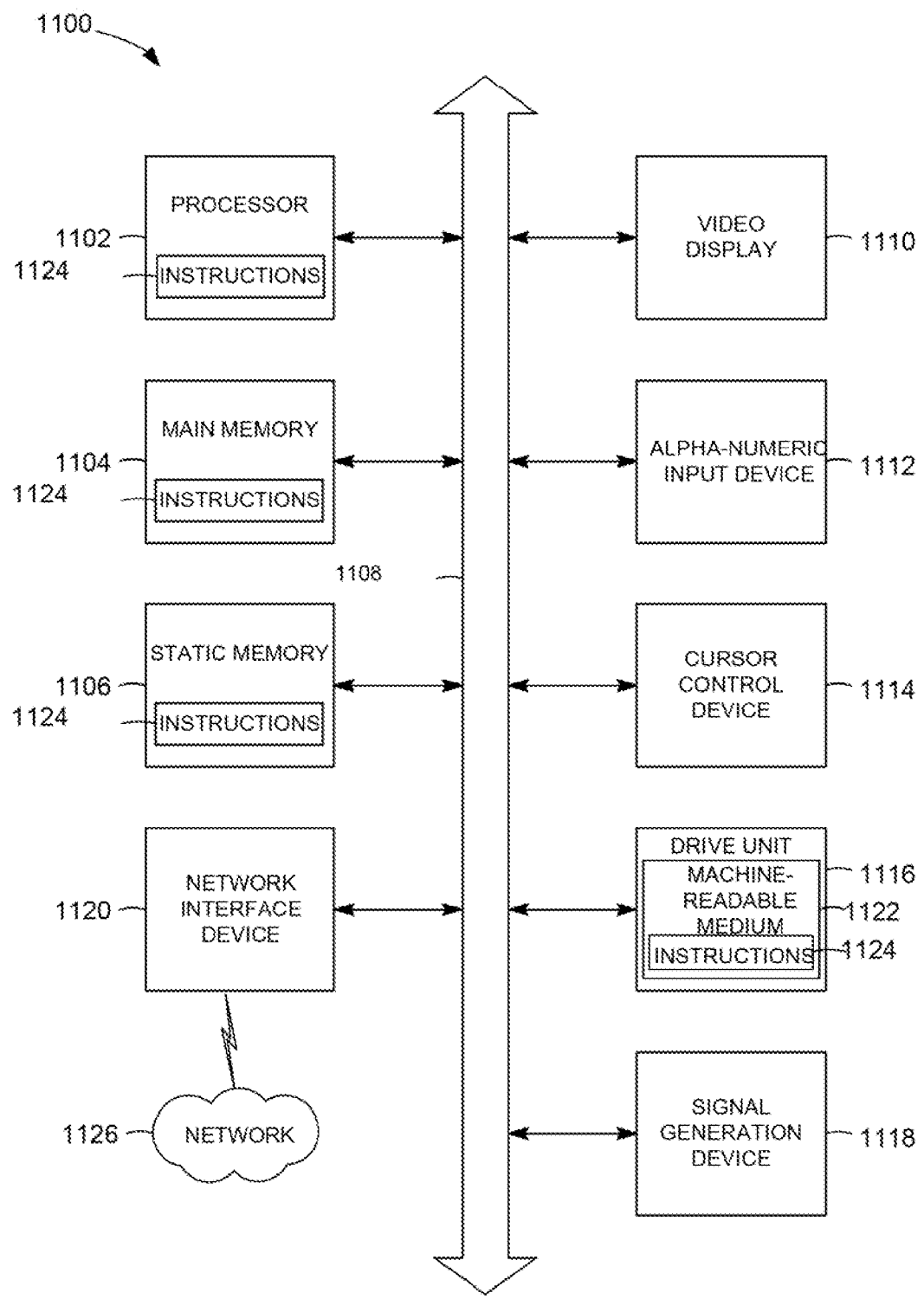
FIG. 11 is a block diagram illustrating an example machine, in accordance with example embodiments.

FIG. 11 is a block diagram illustrating an example machine 1100, in accordance with example embodiments. The example machine 1100 may fully or partially include and/or operate the example embodiments of intermediate device 102, the computer 104, the storage device 106, the imaging device 108, and/or the display device 110 (see FIG. 1).

The machine may be in the example form of a computer system within which a set of instructions, for causing the machine 1100 to perform any one or more of the methodologies discussed herein, may be executed. In alternative or additional example embodiments, the machine 1100 may operate as a standalone device or may be connected (e.g., networked) to other machines. In a networked deployment, the machine 1100 may operate in the capacity of a server or a client machine in server-client network environment, or as a peer machine in a peer-to-peer (or distributed) network environment. The machine 1100 may be a server computer, a client computer, a personal computer (PC), a tablet, a set-top box (STB), a Personal Digital Assistant (PDA), a mobile telephone, a web appliance, a network router, switch or bridge, or any other machine capable of executing a set of instructions (sequential or otherwise) that specify actions to be taken by that machine. Further, while only a single machine 1100 is illustrated, the term "machine" shall also be taken to include any collection of machines that individually or jointly execute a set (or multiple sets) of instructions to perform any one or more of the methodologies discussed herein.

The example machine 1100 is shown to include a processor 1102 (e.g., a central processing unit (CPU) a graphics processing unit (GPU) or both), a main memory 1104 and a static memory 1106, which communicate with each other via a bus 1108. The example machine 1100 is further shown to include a video display unit 1110 (e.g., a liquid crystal display (LCD) or a cathode ray tube (CRT)). The example machine 1100 is also shown to includes an alphanumeric input device 1112 (e.g., a keyboard), a cursor control device 1114 (e.g., a mouse), a drive unit 1116, a signal generation device 1118 (e.g., a speaker) and a network interface device 1120.

The drive unit 1116 is shown to include a machine-readable medium 1122 on which may be stored one or more sets of instructions 1124 (e.g., software) embodying any one or more of the methodologies or functions described herein. The instructions 1124 may also reside, completely or at least partially, within the main memory 1104 and/or within the processor 1102 during execution thereof by the example machine 1100, the main memory 1104 and the processor 1102 also constituting machine-readable media.

The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

Thus, methods and systems to transfer packets have been described. Although the claimed subject matter has been described with reference to specific example embodiments, it will be evident that various modifications and changes may be made to these embodiments without departing from the broader spirit and scope of what is claimed. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
processing a SuperSpeed packet transferred at a SuperSpeed transfer rate, wherein the processing identifies an endpoint associated with the SuperSpeed packet;
based on the endpoint identified during the processing of the SuperSpeed packet, generating a Universal Serial Bus (USB) 2.0 packet to be transferred at a USB 2.0 transfer rate, the USB 2.0 transfer rate being less than the SuperSpeed transfer rate;
associating a SuperSpeed endpoint with a USB 2.0 endpoint, the processing of the SuperSpeed packet including obtaining from the SuperSpeed packet, a SuperSpeed endpoint identifier representing the SuperSpeed endpoint, and the generating of the USB 2.0 packet including placing in the USB 2.0 packet, a USB 2.0 endpoint identifier representing the USB 2.0 endpoint, the USB 2.0 packet to be transferred to the USB 2.0 endpoint.

2. The method of claim 1, further comprising:
processing a plurality of SuperSpeed packets transferred at the SuperSpeed transfer rate; and
based on the processing of the plurality of SuperSpeed packets, generating a plurality of USB 2.0 packets to be transferred at the USB 2.0 transfer rate to a plurality of USB 2.0 devices.

3. The method of claim 1, wherein the processing of the SuperSpeed packet includes obtaining from the SuperSpeed packet the USB 2.0 endpoint identifier representing the USB 2.0 endpoint, and the generating of the USB 2.0 packet includes encoding the USB 2.0 endpoint identifier in the USB 2.0 packet.

4. The method of claim 1, wherein the generating of the USB 2.0 packet includes executing a packet conversion instruction to represent at least one SuperSpeed field of the SuperSpeed packet as at least one USB 2.0 field of the USB 2.0 packet.

5. The method of claim 1, further comprising:
confirming receipt of the SuperSpeed packet at the SuperSpeed endpoint, the SuperSpeed endpoint being associated with a SuperSpeed transaction; and
initiating a USB 2.0 transaction associated with the USB 2.0 endpoint, the generating of the USB 2.0 packet including generating the USB 2.0 packet for the USB 2.0 transaction.

6. The method of claim 1, further comprising:
for another USB 2.0 packet and another SuperSpeed packet:
processing the other USB 2.0 packet transferred at the USB 2.0 transfer rate; and
based on the processing of the other USB 2.0 packet, generating the other SuperSpeed packet to be transferred at the SuperSpeed transfer rate.

7. The method of claim 6, further comprising:
receiving a USB 2.0 path signal;
processing yet another USB 2.0 packet transferred at the USB 2.0 transfer rate; and
selecting a USB 2.0 path responsive to the USB 2.0 path signal to permit the yet another packet to be transferred at the USB 2.0 transfer rate, the generating of the other SuperSpeed packet to be transferred at the SuperSpeed transfer rate being performed responsive to SuperSpeed path signal.

8. The method of claim 6, further comprising:
processing a plurality of other USB 2.0 packets transferred at the USB 2.0 transfer rate from a plurality of USB 2.0 devices; and
based on the processing of the plurality of other USB 2.0 packets, generating a plurality of other SuperSpeed packets to be transferred at the SuperSpeed transfer rate.

9. The method of claim 6, wherein the processing of the other USB 2.0 packet includes obtaining from the other USB 2.0 packet a USB 2.0 endpoint identifier representing a USB 2.0 endpoint, and the generating of the other SuperSpeed packet includes encoding the USB 2.0 endpoint identifier in the other SuperSpeed packet.

10. The method of claim 6, further comprising:
the processing of the other USB 2.0 packet including obtaining from the other USB 2.0 packet, the USB 2.0 endpoint identifier representing the USB 2.0 endpoint, and
the generating of the other SuperSpeed packet including placing in the other SuperSpeed packet, the SuperSpeed endpoint identifier representing the SuperSpeed endpoint.

11. The method of claim 10, wherein the generating of the other SuperSpeed packet includes executing a packet conversion instruction to represent at least one USB 2.0 field of the other USB 2.0 packet as at least one SuperSpeed field of the other SuperSpeed packet.

12. The method of claim 10, further comprising:
requesting the other USB 2.0 packet from the USB 2.0 endpoint prior to the processing of the USB 2.0 packet, the USB 2.0 endpoint being associated with a USB 2.0 transaction,
wherein the other SuperSpeed packet to be transferred from the SuperSpeed endpoint, the SuperSpeed endpoint being associated with a SuperSpeed transaction.

13. A device comprising:
a SuperSpeed packet interface configured to identify an endpoint based on a SuperSpeed packet received at the SuperSpeed packet interface and to obtain, from the SuperSpeed packet, a SuperSpeed endpoint identifier representing a SuperSpeed endpoint;
a Universal Serial Bus (USB) 2.0 packet interface communicatively coupled with the SuperSpeed packet interface, wherein the USB 2.0 packet interface is configured to generate a USB 2.0 packet based on the identified endpoint and to place, in the USB 2.0 packet, a USB 2.0 endpoint identifier representing a USB 2.0 endpoint, the USB 2.0 packet to be transferred to the USB 2.0 endpoint;
an endpoint associator communicatively coupled with the SuperSpeed packet interface and the USB 2.0 packet interface, wherein the endpoint associator is configured to associate the SuperSpeed endpoint with the USB 2.0 endpoint.

14. The device of claim 13, wherein the SuperSpeed packet interface is configured to process the SuperSpeed packet, and the USB 2.0 packet interface is configured to generate the USB 2.0 packet responsive to the SuperSpeed packet interface processing the SuperSpeed packet.

15. The device of claim 14, wherein for another USB 2.0 packet and another SuperSpeed packet, the USB 2.0 packet interface is further configured to process the other USB 2.0 packet, and the SuperSpeed packet interface is further configured to generate the other SuperSpeed packet responsive to the USB 2.0 packet interface processing the other USB 2.0 packet.

16. The device of claim 15, wherein the SuperSpeed packet, the USB 2.0 packet, the other USB 2.0 packet, and the other SuperSpeed packet are all associated with a USB 2.0 transaction between a host and the USB 2.0 endpoint, the SuperSpeed packet interface being configured to generate the other SuperSpeed packet further responsive to a request from the host to complete the USB 2.0 transaction.

17. The device of claim 15 further, comprising:
a packet converter, the packet converter being communicatively coupled with the SuperSpeed packet interface and the USB 2.0 packet interface,
the endpoint associator being configured to:
associate the SuperSpeed endpoint identifier of the SuperSpeed packet with the USB 2.0 endpoint identifier of the USB 2.0 packet, and
associate the USB 2.0 endpoint of the other USB 2.0 packet with the SuperSpeed endpoint of the other SuperSpeed packet, and
the packet converter being configured to:
represent a SuperSpeed field of the SuperSpeed packet as USB 2.0 field of the USB 2.0 packet, and
represent another USB 2.0 field of the other USB 2.0 packet as another SuperSpeed field of the other SuperSpeed packet.

18. The device of claim 15, further comprising:
the SuperSpeed packet interface including a SuperSpeed controller to represent to a host the SuperSpeed endpoint identified by the SuperSpeed endpoint identifier encoded in the SuperSpeed packet, the SuperSpeed endpoint being associated with a SuperSpeed transaction initiated by the host;
the USB 2.0 packet interface including a USB 2.0 host being configured to initiate, through the USB 2.0 packet, a USB 2.0 transaction associated with the USB 2.0 endpoint, the USB 2.0 host being further configured to request the other USB 2.0 packet from the USB 2.0 endpoint;
the endpoint associator being further configured to associate the USB 2.0 endpoint encoded in the other USB 2.0 packet with the SuperSpeed endpoint;
the SuperSpeed controller being further configured to place the SuperSpeed endpoint in the other SuperSpeed packet.

19. A system comprising:
a USB 2.0 device configured to transmit a USB 2.0 packet over a USB 2.0 cable;
an intermediate device communicatively coupled with the USB 2.0 device through the USB 2.0 cable, the intermediate device including:
a first communication interface configured to receive the USB 2.0 packet over the USB 2.0 cable;
a path selector configured to select a path for the USB 2.0 packet to travel responsive to a path signal;
a USB 2.0 host located along the path and configured to receive the USB 2.0 packet and obtain a USB 2.0 endpoint from the USB 2.0 packet;
an endpoint associator configured to associate the obtained USB 2.0 endpoint with a SuperSpeed endpoint, a SuperSpeed controller configured to generate a SuperSpeed packet that includes the SuperSpeed endpoint associated with the obtained USB 2.0 endpoint, and
a second communication interface configured to transmit the generated SuperSpeed packet over the USB 3.0 cable; and
a machine communicatively coupled with the USB 3.0 cable and configured to receive SuperSpeed packet.

20. The system of claim 19, wherein the path selector is configured to select a different path for another USB 2.0 packet to travel responsive to a different path signal,
the USB 2.0 host not being located along the different path,
the USB 2.0 device being configured to transmit the other USB 2.0 packet over the USB 2.0 cable,
the first communication interface being configured to receive the other USB 2.0 packet, and
the second communication interface being configured to transmit the other USB 2.0 packet over the USB 3.0 cable to the machine.

21. The system of claim 20, wherein at least one of the path signal and the different path signal are provided to the path selector through the machine.

\* \* \* \* \*